May 26, 1936.  J. K. SCHAEFER  2,041,966
BATTERY TERMINAL CLAMP
Filed April 23, 1935   3 Sheets-Sheet 1
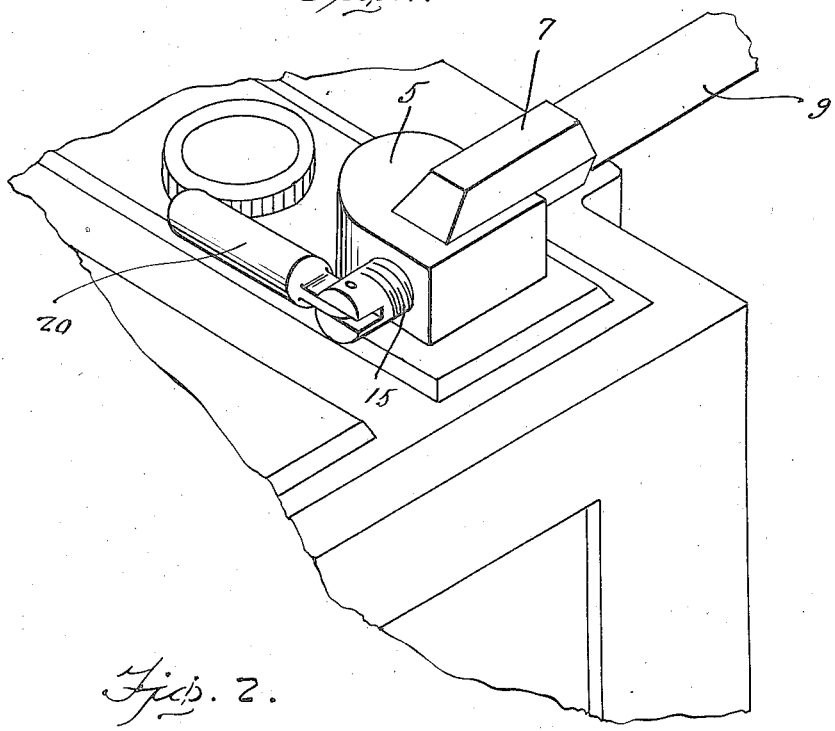
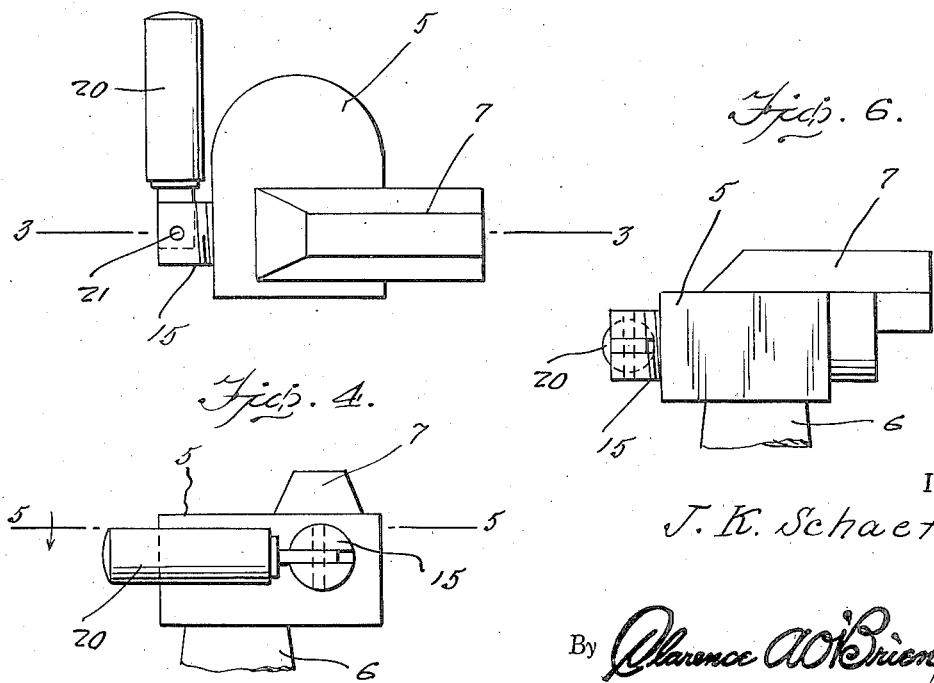
Inventor
J. K. Schaefer
By Clarence A. O'Brien
Attorney

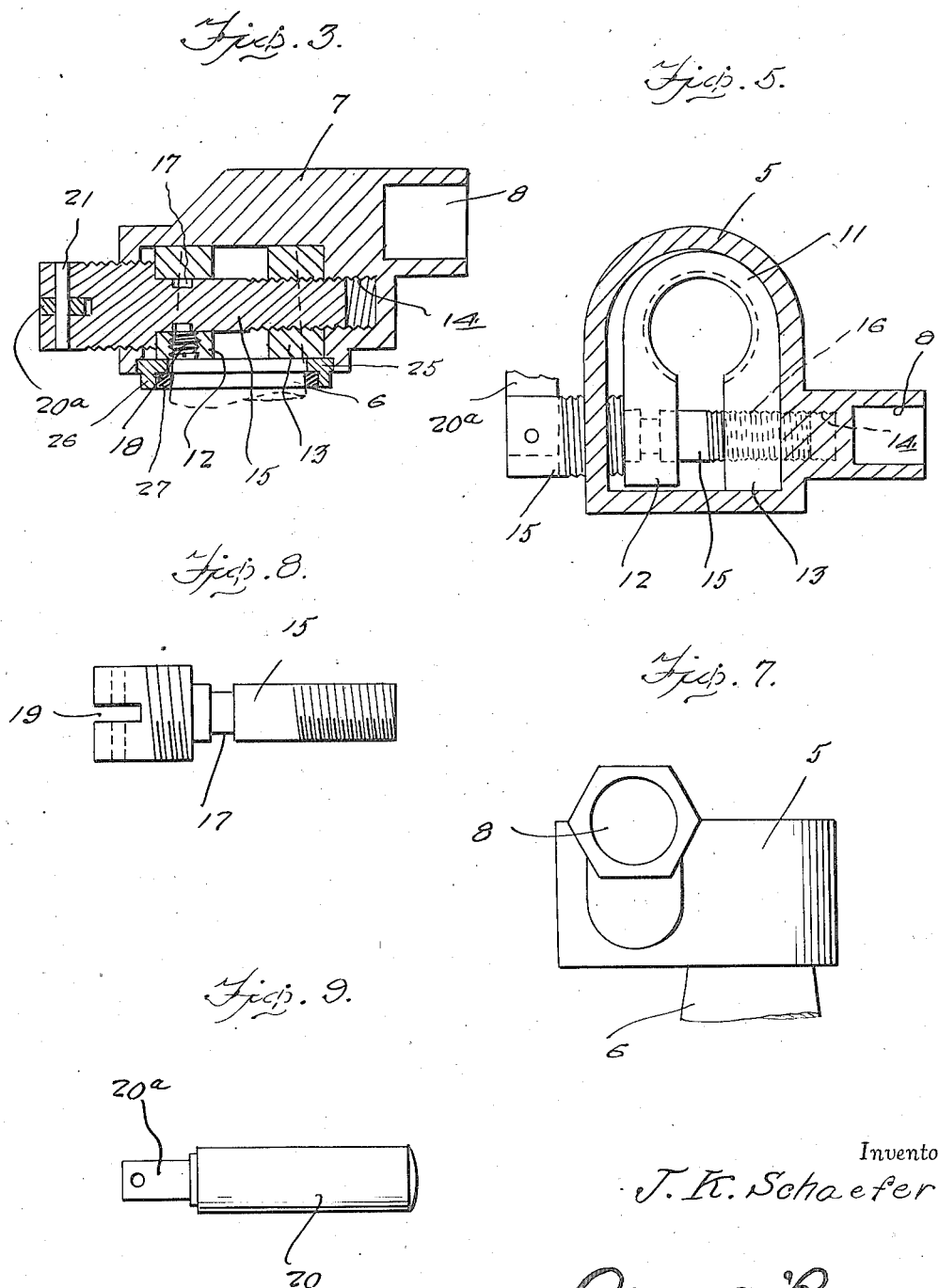

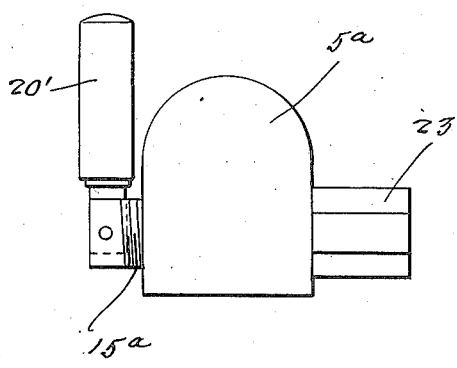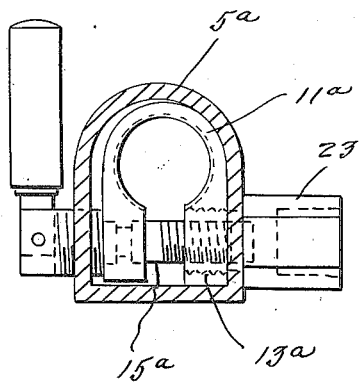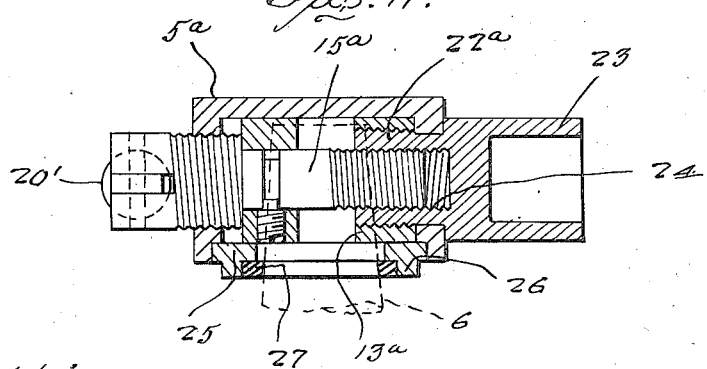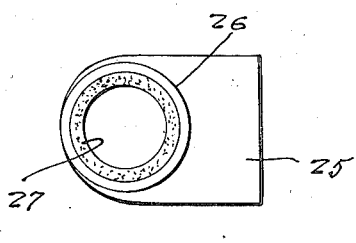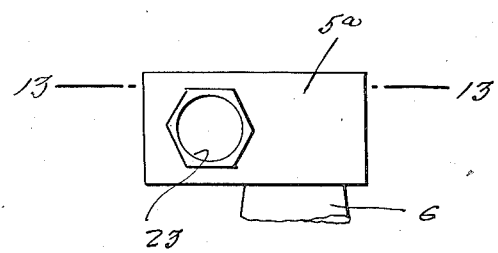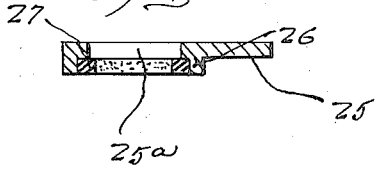

Patented May 26, 1936

2,041,966

UNITED STATES PATENT OFFICE 2,041,966

BATTERY TERMINAL CLAMP

Joseph K. Schaefer, Hollywood, Calif.

Application April 23, 1935, Serial No. 17,847

3 Claims. (Cl. 173—259)

This invention relates to storage battery terminal clamps and more particularly to a split type clamp of this character.

Among the objects of the invention are to provide a battery terminal clamp which can be easily, quickly and rigidly secured to a battery post and removed therefrom with equal facility; to provide a clamp of this character which can be removed from the battery post without the usual spreading, twisting or prying and thus without damage to the clamp, post or any part of the battery; to provide a battery terminal clamp wherein the entire clamp and battery post are covered with an acid resisting material and in an air-tight manner to eliminate corrosion; to provide a clamp of this character wherein one part of the split clamp is stationary and the other is movable together with a bolt suitably associated with the parts of the clamp and the cover for effecting a tightening or release of the clamp; to provide a battery terminal clamp having a handle for the bolt thus obviating the need of resorting to tools to effect a removal or an application of the clamp to the post; as well as to also provide a clamp with a battery outlet so positioned as to allow any number of fittings of the clamp on a post without interfering with the breather cap of the battery; and wherein the clamp may be removed from the cover without disconnecting the cover from the cable, and lastly to provide a battery terminal clamp which can be easily and cheaply manufactured and wherein the parts are readily interchangeable.

The invention together with its objects and advantages will be best understood from a study of the following description taken in connection with the accompanying drawings wherein:

Figure 1 is a perspective view illustrating the application of the clamp.

Figure 2 is a top plan view of the clamp.

Figure 3 is a detail sectional view taken substantially on the line 3—3 of Figure 2.

Figure 4 is an elevational view of the clamp.

Figure 5 is a detail view taken substantially on the line 5—5 of Figure 4.

Figure 6 is an elevational view of the clamp taken at right angles to Figure 4.

Figure 7 is an elevational view taken at right angles to Figure 6.

Figure 8 is a plan view of the bolt.

Figure 9 is a plan view of the handle.

Figure 10 is a plan view of a slightly modified form of clamp.

Figure 11 is a sectional view through the second form of clamp.

Figure 12 is an elevational view of the clamp shown in Figure 10.

Figure 13 is a detail view taken substantially on the line 13—13 of Figure 12.

Figure 14 is a plan view of a cover plate.

Figure 15 is a sectional view through the cover plate.

Referring to the drawings by reference numerals it will be seen that in the form of the invention shown in Figures 1 to 9 inclusive, the improved clamp comprises a housing or cover member 5 of any suitable acid resisting material and of the shape shown so as to fit down over the battery post 6 in a manner clearly suggested in the drawings. Adjacent its top the cover member 5 is formed with an enlargement 7 projecting laterally beyond the cover 5 and in its projected end being provided with a socket 8 for the reception of one end of the battery cable 9.

Housed within the cover 5 is a split clamp member 11 adapted to embrace the battery post as shown and having its ends formed with lugs 12 and 13 respectively, one of which lugs, in the present instance lug 13 is internally threaded as shown, and has its threaded opening in line with a threaded pocket or recess 14 formed in the wall of the cover 5 as best shown in Figure 3.

Threaded through the opposite wall of the cover 5 is the largest portion of a bolt 15 that has a reduced shank portion provided with a non-threaded or smooth section working in the opening of the lug 12 and a threaded section working in the threaded opening of the lug 13 as indicated generally at 16 and as best shown in Figure 5. Said threaded portion is also shown in Figure 3 working in the sprocket 14 of the hood or cover. The non-threaded section of the reduced portion of the bolt 15 is also provided with a peripheral groove 17 to accommodate a set screw 18 threaded into the lug 12 as shown in Figure 3 so as to spread the lug 12 of clamp 11 away from the lug 13 when the clamp is to be removed.

At its enlarged end the bolt 15 is provided with a slot 19 to receive one end of a handle 20 that has a part 20a pivoted within the slot 19 through the medium of a pin 21 as clearly shown. It will thus be obvious that by rotating the bolt 15 in the proper direction the lug 12 will be drawn toward or forced away from the lug 13 as desired to effect either an engagement of the clamp 11 with the battery post or a release of the clamp as found desirable. The manner of applying the clamp to the battery post is thought to be obvious. With the clamp 11 open sufficiently the entire assembly is placed over the post, with the post extending upwardly through the clamp 11 and into the hood 5. The operator then grasps the handle 20 and threads the bolt 15 home or inwardly of the socket 14 causing the lug 12 of the clamp to move inwardly toward the lug 13 of the clamp for contracting the clamp 11 about the battery post and thereby secure the clamp to the post in good electrical engagement therewith. Manifestly, to remove the clamp the bolt 15 is rotated in a reverse direction resulting in the lug 12 of the clamp 11 being forced away from the lug 13, and when the clamp 11 has been sufficiently expanded the entire assembly may be removed from the post 6.

In the form of the invention shown in Figures 10 to 15 inclusive the clamp comprises a housing 5a one side wall of which is provided with an opening to receive the stem 22a of a socket 23 provided for receiving one end of the battery cable.

Arranged within the hood or casing 5a is a clamp 11a whose lug 13a has a threaded bore of sufficient diameter for threadedly receiving the inner end of the stem 22a of the socket 23 as best shown in Figures 11 and 13. Thus in this manner is the socket 23 detachably secured in operative relation to the hood 5a. Threaded through the opposite wall of the hood 5a in alignment with the socket 23 is the largest end of the bolt 15a which is substantially identical with the bolt 15 shown in Figure 8 and previously described in detail. The threaded section of the reduced portion of the bolt 15a screws into the threaded socket 24 provided in the stem 22a of the socket as also best shown in Figure 11. Bolt 15 on its outer or free end is provided with a handle 20' corresponding to the aforementioned handle 20 and pivotally connected to the bolt 15a in the same manner as handle 20 is pivotally connected with this bolt 15 and as previously described.

In both forms of the invention there is provided for the bottom of the hood or cover 5, 5a a fibre plate 25 of substantially the same shape as the hood. This plate 25 fits snugly within the bottom or open end of the hood as shown in Figures 3 and 11 and at one end is provided with an opening concentric to which is a depending flange 26 spaced outwardly from the edge of the opening to provide a seat for a gasket 27. The opening 25a accommodates the battery post 6 in the manner suggested in Figures 3 and 11 and the gasket 27 fits snugly about the post 6. The ring 27 is preferably made of soft rubber and fits snugly around the battery terminal post so that together with the plate 25 the hood will be substantially completely air tight.

It is thought that a clear understanding of the invention will be had from the foregoing and that it will be appreciated that a clamp embodying the features of construction contemplated by the present invention will be capable of fulfilling the objects of the invention as set out hereinbefore.

Having thus described the invention, what is claimed as new is:

1. A battery terminal clamp comprising a hood of conducting material adapted to fit down over the battery post, said hood being provided with a socket for connection with a cable, a split clamp arranged within the hood to embrace the post and provided with a pair of opposing apertured lugs, one of these lugs having its aperture threaded, a bolt extending laterally through an opening in the hood and also extending through the apertures in said lugs and having a threaded part working in the threaded aperture of said one lug and a nonthreaded grooved part working in the aperture of the other lug of said clamp, and a set screw threadedly engaged with the last named lug and extending into said groove whereby a rotation of the bolt will cause either a spreading or a drawing of lugs toward one another, said bolt having an end accessible externally of the hood for rotation of the bolt for either drawing said lugs together or forcing them apart optionally.

2. A battery terminal clamp comprising a hood, a split clamp arranged within the hood and provided with opposed apertured lugs one of which has its aperture threaded, a cable socket having a threaded stem extending inwardly through a lateral opening in said hood and screw threadedly engaged with the threaded aperture of said one lug, said stem also having a threaded bore, a clamping screw for the split clamp extending through a lateral opening in the hood, the apertures in said lugs, and threadedly engaged in the bore of said stem and interengaging means on the other of said apertured lugs of said clamp and on said clamping screw for retaining the clamping screw against axial movement through the aperture of said other lug whereby rotation of the bolt will cause a spreading of the lugs of the clamp when the clamp is to be removed.

3. A battery terminal clamp comprising a hood opened at its bottom, a split clamp arranged within the hood and provided with opposed apertured lugs one of which has its aperture threaded, a bolt extending through a lateral opening in the hood and the apertures in said lugs and having threaded portions respectively engaging with the threaded aperture of said one lug and with fixed threads at the adjacent side of said hood, a set screw threadedly engaged with the other lug of said clamp and having an end engaging a groove in said bolt whereby a rotation of the bolt will cause a spreading of the second lug away from the first lug when the clamp is to be removed, and a fibre closure plate for the open bottom of the hood, said plate having an opening therein to accommodate the battery post and a flange disposed concentric to the opening, and a gasket fitting about the opening within the confines of said flange to embrace the battery post whereby to provide an air tight closure for the hood.

JOSEPH K. SCHAEFER.